(12) United States Patent
Topal

(10) Patent No.: US 10,983,066 B2
(45) Date of Patent: Apr. 20, 2021

(54) AUGMENTED REALITY-BASED TEST MECHANISM

(71) Applicant: ANADOLU UNIVERSITESI REKTORLUGU, Eskisehir (TR)

(72) Inventor: Cihan Topal, Eskisehir (TR)

(73) Assignee: ANADOLU UNIVERSITESI REKTORLUGU, Eskisehir (TR)

( * ) Notice: Subject to any disclaimer, the term of this patent is extended or adjusted under 35 U.S.C. 154(b) by 0 days.

(21) Appl. No.: 16/477,953

(22) PCT Filed: Jan. 11, 2018

(86) PCT No.: PCT/TR2018/050009
§ 371 (c)(1),
(2) Date: Jul. 15, 2019

(87) PCT Pub. No.: WO2019/009846
PCT Pub. Date: Jan. 10, 2019

(65) Prior Publication Data
US 2019/0369028 A1 Dec. 5, 2019

(30) Foreign Application Priority Data

Jan. 13, 2017 (TR) .................................. 2017/00580

(51) Int. Cl.
*G01N 21/88* (2006.01)
*G06T 7/90* (2017.01)
(Continued)

(52) U.S. Cl.
CPC ..... *G01N 21/8806* (2013.01); *G01N 21/8803* (2013.01); *G01N 21/8851* (2013.01);
(Continued)

(58) Field of Classification Search
CPC ........... G01N 21/8806; G01N 21/8803; G01N 21/8851; G01N 21/95; G01N 2021/888;
(Continued)

(56) References Cited

U.S. PATENT DOCUMENTS 4,486,776 A * 12/1984 Yoshida .................. B07C 5/126
348/132
6,084,979 A * 7/2000 Kanade ................ H04N 13/243
13/243

(Continued)

*Primary Examiner* — Nimesh Patel
(74) *Attorney, Agent, or Firm* — Amster, Rothstein & Ebenstein LLP

(57) ABSTRACT

The present invention is a test mechanism for structural defect detection of a test object (400). Accordingly, said test mechanism is characterized in that a light source (200) is provided which accommodates pluralities of light elements (210) which can emit light in at least two different colors and which changes the light emitting condition of said light elements (210) in accordance with the signal received from a processor unit (310), an image capturing device (100) is provided which captures the image of the test object (400) positioned on a test surface (220) defined on the light elements (210) and connected to the processor unit (310) in a manner transmitting the captured image to the processor unit (310) as input; the processor unit (310) is configured in a manner providing changing of the light emitting condition of light elements (210) in a manner mentioning approval/defect for the light source (200) in accordance with the difference of the captured image from an object model (329) of the memory unit (320).

5 Claims, 4 Drawing Sheets

(51) Int. Cl.
*G01N 21/95* (2006.01)
*G06T 7/00* (2017.01)

(52) U.S. Cl.
CPC ............ *G01N 21/95* (2013.01); *G06T 7/0004* (2013.01); *G06T 7/90* (2017.01); *G01N 2021/888* (2013.01); *G06T 2207/10024* (2013.01); *G06T 2207/30108* (2013.01)

(58) Field of Classification Search
CPC ....... G01N 2021/9513; G01N 29/4436; G01N 29/043; G01N 29/0645; G01N 29/262; G01N 2291/0231; G01N 29/265; G01N 2291/0289; G01N 2291/044; G01N 29/04; G01N 29/069; G01N 29/30; G01N 2021/8829; G01N 21/25; G01N 29/06; G01N 29/07; G01N 29/223; G01N 29/226; G01N 29/27; G01N 29/4472; G06T 7/90; G06T 7/0004; G06T 2207/10024; G06T 2207/30108; G06T 19/006; G06T 2207/10048; G06T 2207/30041; G06T 7/0012; G06T 7/70; G06T 2207/30121; G06T 11/001; G06T 2207/10016; G06T 2207/30201; G06T 7/001; G06T 7/73; G06T 11/20; G06T 2200/24; G06T 2207/10012; B07C 7/005; H04N 13/324; H04N 13/344; H04N 17/00; H04N 2013/0081; H04N 17/02; H04N 1/6052; H04N 9/73; H04N 17/045; H04N 9/3147; H04N 9/3191; H04N 13/122; H04N 13/128; H04N 13/133; H04N 13/20; H04N 9/3105; H04N 11/2518; H04N 1/56; A61B 3/024; A61B 3/032; A61B 3/066; A61B 5/1072; A61B 5/7267; A61B 5/1128; A61B 3/08; A61B 5/742; A61B 2562/0204; G06F 3/04842; G06F 3/1446; G06F 30/00; G06F 3/04812; G06F 3/04845; G06F 19/3481; G06F 11/3688; G06F 19/00; G06F 19/3456; G09G 5/02; G09G 1/165; G09G 2320/06; G09G 2320/08; G09G 2300/026; G09G 2320/0666; G09G 2320/0686; G09G 2340/06; G09G 2354/00; G09G 2356/00; G09G 3/2003; G09G 3/3426; G09G 5/00; G09G 5/026; G09G 5/06; G09G 3/006; G09G 2320/0693; G09G 3/002; G09G 3/34; G09G 3/346; G09G 3/3611; G09G 5/346; G02B 2027/0132; G02B 2027/0136; G02B 27/017; G02B 27/0172; G02B 26/10; G02B 27/0025; G06K 9/00362; G06K 9/00771; G06K 9/00778; G06K 9/2027; G06K 7/10792; G06K 2209/19; G06K 9/2063; G06K 9/4652; G01B 1/6077; G01B 21/16; G01B 21/20; G01B 21/22; G01B 11/2509; G01B 11/2513; G01B 11/165; G01B 11/245; G01B 11/272; G01J 3/506; G01J 3/46; G01J 3/524; G01J 2003/466; G01J 3/465; G01J 3/501

See application file for complete search history.

(56) References Cited

U.S. PATENT DOCUMENTS

| | | | |
|---|---|---|---|
| 2003/0083850 A1* | 5/2003 | Schmidt | G06T 7/001 702/189 |
| 2007/0019186 A1* | 1/2007 | Sung | G01N 21/95684 356/237.5 |
| 2007/0119518 A1* | 5/2007 | Carman | B07C 5/14 144/356 |
| 2014/0333778 A1* | 11/2014 | Bendall | G01B 21/042 348/187 |
| 2016/0016274 A1* | 1/2016 | Grau | B23Q 3/155 356/612 |
| 2016/0292831 A1* | 10/2016 | Bogan | G06T 5/006 |
| 2017/0103510 A1* | 4/2017 | Wang | G06T 7/38 |

* cited by examiner

AUGMENTED REALITY-BASED TEST MECHANISM

TECHNICAL FIELD

The present invention relates to test mechanisms for structural defect detection of a test object displayed by an image capturing device.

PRIOR ART

Various methods are used for realizing structural defect detection of planar objects in two dimensions. In the present art, there are systems where the image of a test object is captured and where this image is compared with the reference image in a memory unit and in case there is difference, where the information related to this difference is presented to the user on a separate display. In these systems, the image of the object is captured by an image capturing unit and the defects are determined according to the differences from the required form and the information related to these defects is presented on a display. Since the operator focuses on the object and on the display in a separate manner, the cognitive load of the operator increases and the usage becomes difficult. Moreover, the defect detection of planar objects comprising transparent item is realized in a lower correctness when compared with the defect detection of non-transparent objects in such systems.

As a result, because of all of the abovementioned problems, an improvement is required in the related technical field.

BRIEF DESCRIPTION OF THE INVENTION

The present invention relates to a test mechanism, for eliminating the above mentioned disadvantages and for bringing new advantages to the related technical field.

An object of the present invention is to provide a test mechanism and method where the defects of planar objects are detected.

Another object of the present invention is to provide a test mechanism and method which provide usage facility to the test operator and which reduces the cognitive load of the test operator.

Another object of the present invention is to provide a test mechanism and method which also provide testing of the test objects comprising transparent regions.

In order to realize all of the abovementioned objects and the objects which are to be deducted from the detailed description below, the present invention is a test mechanism for structural defect detection of a test object. Accordingly, the improvement of the present invention is that a light source is provided which accommodates pluralities of light elements which can emit light in at least two different colors and which changes the light emitting condition of said light elements in accordance with the signal received from a processor unit; and an image capturing device is provided which captures the image of the test object positioned on a test surface defined on the light elements and connected to the processor unit in a manner transmitting the captured image to the processor unit as input; the processor unit is configured in a manner providing changing of the light emitting condition of light elements in a manner mentioning approval/defect for the light source in accordance with the difference of the captured image from an object model of the memory unit. Thus, since the light source is used for informing the user with the defect, it provides usage facility to the test operator.

In a preferred embodiment of the invention, the processor unit is embodied in a manner detecting the coordinates where the object is positioned on the test surface from the captured image; and the processor unit is moreover embodied in a manner detecting the coordinates on the test surface corresponding to the vicinity of the defecty sections where the test object is different from the object model and the light source is embodied in a manner changing the light emitting conditions in a manner providing emitting light in different colors for the light elements in the vicinity of these coordinates from the other light elements. Thus, the section where defect occurs is presented to the test operator by means of augmented reality.

In another preferred embodiment of the invention, said object comprises at least one transparent pattern which at least partially transmits light, the processor unit is embodied in a manner providing changing of the light emitting conditions in a manner providing emitting light in different colors for at least one of the light elements of the light source, which corresponds to the transparent pattern comprising the defecty section, from the other light elements when a defecty section is detected on the walls of the transparent patterns. Thus, the defects in the transparent objects can be detected by the test operator easily.

In another preferred embodiment of the invention, the test object is white good front panel, it is particularly a washing machine front panel.

In another preferred embodiment of the invention, said light source is an electronic display.

The present invention is moreover a test method for structural defect detection of a test object. Accordingly, the improvement of the present invention is as follows:

a) Placing a test object between an image capturing device facing the light source and a light source which changes the light emitting condition of said light elements in accordance with the signal received from a processor unit and which accommodates pluralities of light elements which can emit light in at least two different colors, b) Capturing at least one image of said test object by the image capturing device and transferring said image to the processor unit, c) Comparing the image, taken from the image capturing device, by an object model in a memory unit by the processor unit, d) Transferring signal to the light source in a manner changing the light emitting condition of the light elements in a manner describing approval/defect by the light source according to the object model of the taken image by the processor unit.

In another preferred embodiment of the invention, the further steps are provided:

e) Detecting the coordinates, where the test object is positioned on the test surface, from the image taken by the processor unit, f) Detecting the coordinates on the test surface corresponding to the defecty sections, where the test object is different from the object model, by the processor unit, g) Transferring signal in a manner providing emitting light in different color of the light elements from the other light elements in said coordinates or in the vicinity of said coordinates of the light source by the processor unit.

In another preferred embodiment of the invention, step g comprises the sub-steps of:

h) Providing changing of the light emitting conditions by the processor unit by the light elements in a manner defining a warning item, which marks the coordinates or the vicinity of said coordinates where defect is existing, to the light source in case there is defect.

DETAILED DESCRIPTION OF THE INVENTION

In this detailed description, the subject matter test mechanism is explained with references to examples without forming any restrictive effect only in order to make the subject more understandable.

Figure 1:
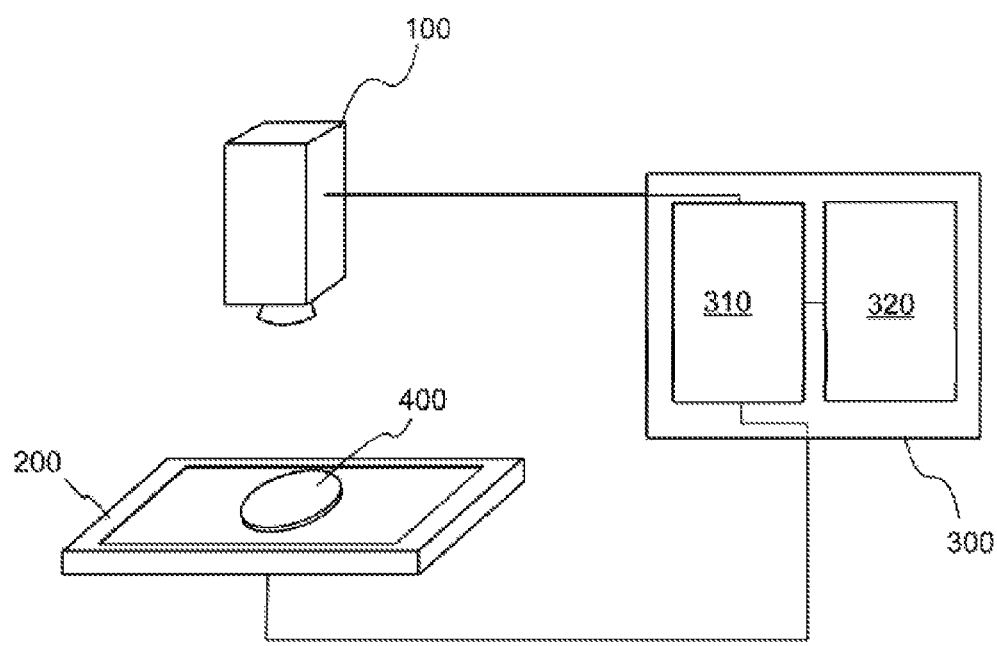
In FIG. 1, a representative view of the test mechanism is given.
Figure 2:
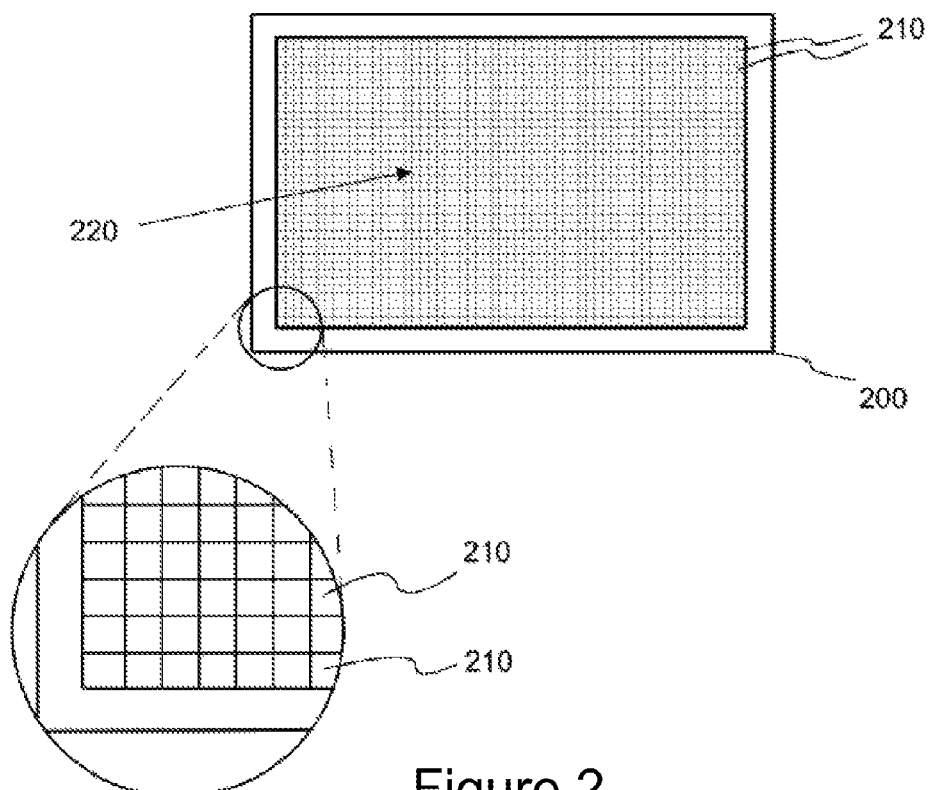
In FIG. 2, a representative view of the light source is given.

With reference to FIG. 1, said mechanism comprises a light source (200) whereon the test object (400) is positioned, an image capturing device (100) which captures the image of the test object (400), a control unit (300) which takes the image from the image device and which changes the light emitting condition of said light source (200) and which provides feedback related to the defect in the test object (400).

The change of the light emitting condition can be providing light emitting at different wavelengths of light sources, for example, bringing of the light source from the open condition to the closed condition and bringing of the light source from the closed condition to the open condition.

Said control unit (300) comprises a processor unit (310). The processor unit (310) is connected to a memory unit (320) in a manner providing data transfer. The processor unit (310) can be a microprocessor, a general-purpose or special-purpose processor (CPU, GPU) or it can be the suitable combinations of them. The memory unit (320) can be a memory which can store data in a temporary or permanent manner (RAM, ROM) or the combinations thereof connected in a suitable manner. The memory unit (320) moreover comprises at least one object model (329). Said object model (329) can be the 2-dimensional model of a defectless test object (400) formed in computer medium. The memory unit (320) can comprise different models for different test objects. The object model (329) can be in the form as viewed by the image capturing device (100) when placed on the light source (200) of a defectless test object (400). In this exemplary embodiment, the control unit (300) is a computer.

In this exemplary embodiment, said image capturing device (100) is a camera. The camera inputs the captured images to the control unit (300). The camera is directed to the light source (200) and it captures the image of the test object (400) positioned above the light source (200).

Said light source (200) comprises pluralities of light elements (210) where each one of the light elements (210) can emit light in at least two different colors in an alternating manner. A surface defined by the light elements (210) arranged side by side is defined as the test surface (220). The test object (400) is positioned on this test surface (220). In this exemplary embodiment, the light source (200) is a monitor. The light elements (210) are items which provide light emitting by each pixel and the test surface (220) is the display surface. The light source (200) can be a mechanism obtained by bringing pluralities of LEDs together and by driving thereof in a suitable manner.

Figure 6:
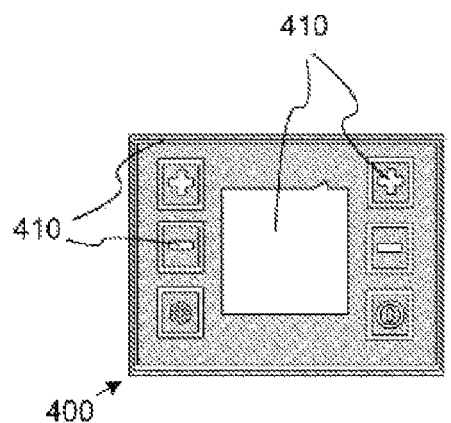
In FIG. 6, a representative view of the test object in an alternative embodiment is given.

The test object (400) preferably has a flat structure. With reference to FIG. 6, the test object (400) comprises a transparent pattern (410) in an alternative embodiment. The transparent pattern (410) has a structure which at least partially transmits light. In this alternative embodiment, the test object (400) is preferably a white good front panel produced by means of serigraphy.

Figure 3:
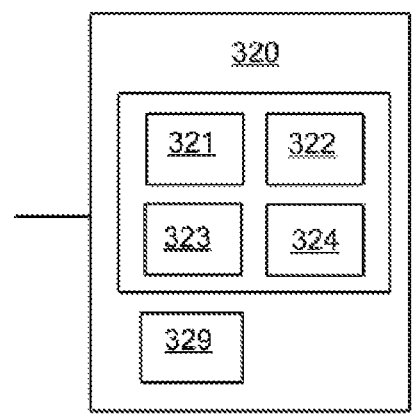
In FIG. 3, a more detailed representative view of the memory unit is given.
Figure 4:
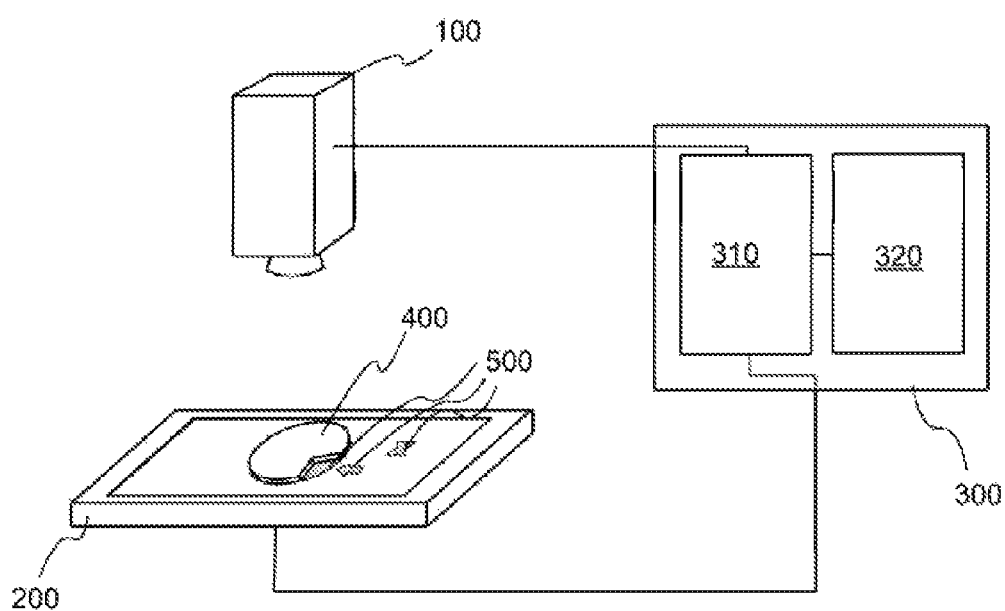
In FIG. 4, a representative view of the test mechanism is given where defect has been detected.
Figure 5:
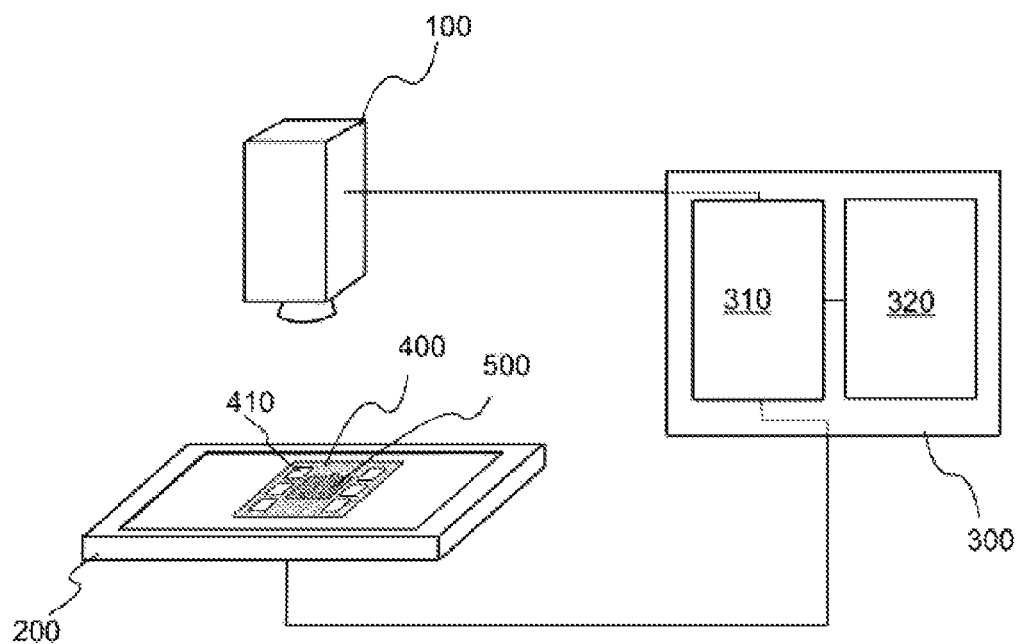
In FIG. 5, a representative view of an alternative embodiment of the test mechanism is given.

With reference to FIG. 3, the memory unit (320) moreover comprises functional modules which accommodate command lines executed for realizing the processes required for operation of the mechanism by the processor unit (310). A data receiving module (321) provides receiving of the instantaneous images from the image capturing device (100). A position determination module (322) determines the position of the test object (400) on the test surface (220). Said position determination module (322) uses the image processing methods known in the art and it can determine the position of the test object (400). The position determination module (322) for example may comprise algorithms which realize edge search or circle search on the test surface (220) whose size and orientation are known. A defect determination module (323) compares the object model (329) and the captured image and it determines the defects and the position of these defects on the test surface (220).

A defect visualization module (324) provides the light elements (210), which correspond to the test surface (220) in the vicinity of the region where the defects exist in the test object (400), to emit light which is different from the other light elements (210). For instance, if there is a deficient region in the vicinity of the walls of the object, the light elements (210) provided in the vicinity of the deficient region walls provide emitting light in a different manner in a manner visible by the user. Additionally, these light elements (210) can emit light in a manner defining a warning item (500) in a sign form like a writing or tick, arrow in relation to the defect. In case the test object (400) is defectless within the mentioned limits, the light emitting conditions can be changed by the processor unit (310) in a manner defining a warning item (500) which mentions approval of the light elements (210).

The operation of the mechanism, whose details are given above, is as follows:

The test object (400) is placed onto the test surface (220) of the light source (200). The image capturing device (100) captures the image of the test object (400) and transfers said image to the processor unit (310) as input. The images received by means of the data receiving module (321) are processed, and the position of the test object (400) on the test surface (220) is determined by the position determination module (322). The test object (400) is compared with the object model (329) by the defect determination module (323), and by taking into consideration the differences between the test object (400) and the object model (329), the defects in the test object (400) are found and the coordinates of these defects on the test surface (220) are determined. The defect visualization module (324) provides the light elements (210), existing in the vicinity of said coordinates, to emit light in different color when compared with the other light elements (210). Thus, the user can view the defect in the object, placed on the test surface (220), in the vicinity of the object and there is no need for the user to turn his/her head to another direction. Thus, the defect or approval statements are presented to the user by means of augmented reality.

This method and mechanism can be used in the detection of millimetrical defects on panels comprising transparent regions and produced by means of serigraphy like the white good front panel. In case there is a defect on the transparent pattern (410) wall, this transparent region is illuminated in a different color and the defect can be presented to the user in an apparent manner. This method can be used for any broad and shallow test object (400) or for any test object (400) which shall be placed in front of the light source (200) in order to view the defect.

The protection scope of the present invention is set forth in the annexed Claims and cannot be restricted to the illustrative disclosures given above, under the detailed description. It is because a person skilled in the relevant art can obviously produce similar embodiments under the light of the foregoing disclosures, without departing from the main principles of the present invention.

REFERENCE NUMBERS

100 Image capturing device
200 Light source
210 Light element
220 Test surface
300 Control unit
310 Processor unit
320 Memory unit
321 Data receiving module
322 Position determination module
323 Defect determination module
324 Defect visualization module
329 Object model
400 Test object
410 Transparent pattern
500 Warning item

The invention claimed is:

1. A test mechanism for structural defect detection of a test object which is planar, comprising:
   a light source which accommodates pluralities of light elements which can emit light in at least two different colors and which changes the light emitting condition of said light elements in accordance with the signal received from a processor unit;
   a test surface defined by the light elements arranged side by;
   an image capturing device which captures the image of the test object positioned on a said test surface, defined on the light elements and connected to the processor unit in a manner transmitting the captured image to the processor unit as input;
   a computer readable memory unit, coupled to the processor unit and storing computer executable instructions thereon, which when computer executable instructions are executed by the processor unit, cause the processor unit to carry out following actions:
      from the captured image determining the coordinates where the object is positioned on the test surface,
      detecting the coordinates on the test surface corresponding to at least one defecty section, where the test object is different from an object model stored in the memory unit,
      determining the coordinates on the test surface corresponding to the vicinity of the defecty sections where the test object is different from the object model,
      controlling light source in a manner providing the light elements which are in the vicinity of determined coordinates corresponding to the vicinity of the defecty sections emitting light in different colors from the other light elements for indicating defect,
   wherein said object comprises at least one transparent pattern which at least partially transmits light, the processor unit is embodied in a manner providing changing of the light emitting conditions in a manner providing emitting light in different colors for at least one of the light elements of the light source, which corresponds to the transparent pattern comprising the defecty section, from the other light elements.

2. A test mechanism according to claim 1, wherein the test object is white good front panel, it is particularly a washing machine, dishwasher, drier or oven front panel.

3. A test mechanism according to claim 1, wherein said light source is an electronic display.

4. A test method for structural defect detection of a test object comprising the following steps carried out by a processor unit, which is connected to a computer readable memory unit storing computer executable instructions thereon, which when computer executable instructions is executed by the processor unit, cause the processor unit to carry out said steps:
   a) controlling an image capturing device to capture image of a test object which is positioned between said image capturing device facing a light source and said light source which accommodates pluralities of light elements which emit light in at least two different colors, which changes the light emitting condition of said light elements in accordance with the signal received from the processor unit,
   b) receiving said image,
   c) comparing received image, to an object model in the memory unit,
   d) controlling the light source in a manner changing the light emitting condition of the light elements in a manner indicating approval/defect by the light source according to the object model of the taken image by the processor unit,
   e) detecting the coordinates, where the test object is positioned on the test surface, from the image taken by the processor unit,
   f) detecting the coordinates on the test surface corresponding to the defecty sections, where the test object is different from the object model, by the processor unit,
   g) controlling the light source in a manner providing emitting light in different color of the light elements from the other light elements in said coordinates or in the vicinity of said coordinates of the light source.

5. A test method according to claim 4, wherein step g) comprises the sub-steps of:
   h) providing changing of the light emitting conditions of the light elements in a manner defining a warning item, which marks the coordinates or the vicinity of said coordinates where defect is existing, to the light source in case there is defect.

* * * * *